United States Patent
Bloesch

(10) Patent No.: US 7,702,668 B2
(45) Date of Patent: Apr. 20, 2010

(54) ASSET COMPOSITION

(75) Inventor: Anthony Bloesch, Vashon, WA (US)

(73) Assignee: Microsoft Corporation, Redmond, WA (US)

( * ) Notice: Subject to any disclaimer, the term of this patent is extended or adjusted under 35 U.S.C. 154(b) by 1138 days.

(21) Appl. No.: 10/462,413

(22) Filed: Jun. 16, 2003

(65) Prior Publication Data

US 2004/0254951 A1 Dec. 16, 2004

(51) Int. Cl.
*G06F 17/30* (2006.01)
(52) U.S. Cl. .................................................. 707/617
(58) Field of Classification Search .................. None
See application file for complete search history.

(56) References Cited

U.S. PATENT DOCUMENTS

| | | | |
|---|---|---|---|
| 5,204,897 A | | 4/1993 | Wyman |
| 5,495,610 A | * | 2/1996 | Shing et al. ............... 709/221 |
| 5,513,343 A | * | 4/1996 | Sakano et al. .............. 714/26 |
| 5,621,663 A | * | 4/1997 | Skagerling ................ 702/186 |
| 5,740,405 A | | 4/1998 | DeGraaf |
| 5,742,829 A | * | 4/1998 | Davis et al. ................ 717/178 |
| 5,809,212 A | * | 9/1998 | Shasha ....................... 706/46 |
| 5,933,647 A | * | 8/1999 | Aronberg et al. .......... 717/178 |
| 6,058,426 A | * | 5/2000 | Godwin et al. ............ 709/229 |
| 6,061,794 A | | 5/2000 | Angelo et al. |
| 6,105,069 A | * | 8/2000 | Franklin et al. ........... 709/229 |
| 6,199,204 B1 | * | 3/2001 | Donohue .................... 717/178 |
| 6,219,700 B1 | * | 4/2001 | Chang et al. ............... 709/222 |
| 6,237,020 B1 | * | 5/2001 | Leymann et al. .......... 709/201 |
| 6,256,668 B1 | | 7/2001 | Slivka et al. |
| 6,263,313 B1 | | 7/2001 | Milsted et al. |
| 6,347,398 B1 | | 2/2002 | Parthasarathy et al. |
| 6,381,735 B1 | | 4/2002 | Hunt |
| 6,487,718 B1 | * | 11/2002 | Rodriguez et al. ......... 717/177 |
| 6,502,174 B1 | | 12/2002 | Beardsley et al. |
| 6,598,060 B2 | | 7/2003 | Goldick |
| 6,606,744 B1 | * | 8/2003 | Mikurak ..................... 717/174 |
| 6,640,231 B1 | | 10/2003 | Andersen et al. |
| 6,928,469 B1 | * | 8/2005 | Duursma et al. ........... 709/223 |
| 6,982,710 B2 | * | 1/2006 | Salomie ..................... 345/420 |
| 7,027,055 B2 | | 4/2006 | Anderson et al. |
| 2003/0004968 A1 | * | 1/2003 | Romer et al. ............. 707/104.1 |
| 2003/0078958 A1 | | 4/2003 | Pace et al. |
| 2003/0101108 A1 | * | 5/2003 | Botham et al. ............... 705/28 |
| 2003/0172127 A1 | * | 9/2003 | Northrup et al. ........... 709/219 |
| 2003/0216927 A1 | * | 11/2003 | Sridhar et al. ................ 705/1 |

(Continued)

OTHER PUBLICATIONS

"Systems Management Server: Feature Highlights." Microsoft.com, http://www.microsoft.com/smserver/evaluation/previous/features.mspx. Jul. 7, 2003.*

(Continued)

*Primary Examiner*—Neveen Abel-Jalil
*Assistant Examiner*—Mark Andrew X Radtke
(74) *Attorney, Agent, or Firm*—Workman Nydegger

(57) ABSTRACT

A system and method facilitating asset composition based, at least in part, upon metadata (e.g., asset specification) describing compositional property(ies) of the asset(s) is provided. Asset specification(s) (e.g., metadata) that describe asset(s) to efficiently search and/or match asset(s) are employed. The system can facilitate matching (e.g., automatically) the particular software component to available server(s). Thus, the system can provide a flexible manner of describing asset(s) and an efficient way of locating matching description(s).

7 Claims, 8 Drawing Sheets

U.S. PATENT DOCUMENTS

2004/0254951 A1* 12/2004 Bloesch .................. 707/102

OTHER PUBLICATIONS

E. Swierk, E. Kiciman, N.C. Williams, T. Fukushima, H. Yoshida, V. Laviano, and M. Baker. The Roma Personal Metadata Service. Mobile Networks and Applications, vol. 7 Issue 5, pp. 407-418, 2002.

Reidar Conradi and Bernhard Westfechtel. Version Models for Software Configuration Management. ACM Computing Surveys, vol. 30 Issue 2, pp. 232-282, 1998.

Henson "An Analysis of Compare-by-Hash," In: Proceedings of HotOS IX: The 9th Workshop on Hot Topics in Operating Systems, pp. 13-18, May 18-21, 2003.

OA Dated Aug. 6, 2008 for U.S. Appl. No. 11/332,967, 16 pages.

Schneier. "One Way Hash Functions" In Applied Cryptography, Second Edition, John Wiley & Sons, 1996, Section 2.4.

OA Dated Jan. 23, 2009 for U.S. Appl. No. 11/332,967, 21 pages.

* cited by examiner

410 — ASSET DESCRIPTION:

$420_1$ — ASSET DESCRIPTION GROUND PREDICATE$_1$

•
•
•

$420_P$ — ASSET DESCRIPTION GROUND PREDICATE$_P$

430 — PORT SPECIFICATIONS $440_1$ — PORT DESCRIPTION $460_1$ — PORT DESCRIPTION GROUND PREDICATE$_1$

•
•
•

$460_S$ — PORT DESCRIPTION GROUND PREDICATE$_S$

450 — INTERFACE

470 — CONFIGURATION SECTION

480 — SERVICES SECTION

488 — REQUIREMENTS SECTION

496 — WANTS SECTION

FIG. 4

ASSET COMPOSITION

TECHNICAL FIELD

The present invention relates generally to asset composition, and, more particularly to a system and method of composing asset(s) based, at least in part, upon metadata describing compositional property(ies) of the asset(s).

BACKGROUND OF THE INVENTION

Information technology ("IT") infrastructure has expanded rapidly to a point where there is significant cost associated with managing/deploying software and/or hardware. For example, a single entity can simultaneously run different versions of an operating system, different operating system(s) and/or hardware manufactured by a variety of manufacturers. Accurately providing appropriate software for an operating environment can be a daunting task. As such, conventional technology for managing/deploying software and/or hardware has been time-consuming and prone to error(s).

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for a system and method facilitating asset composition based, at least in part, upon metadata (e.g., asset specification) describing compositional property(ies) of the asset(s). "Asset(s)" includes computer hardware, software (e.g., component(s), operating system(s) and/or database management system(s)). The system employs asset specification(s) (e.g., metadata) that describe asset(s) to efficiently search and/or match asset(s). For example, a software component can require installation of a particular version of SQL Server on a server with a respective operating system and a certain amount of available memory. The system can facilitate matching (e.g., automatically) the software component to available server(s). Thus, the system can provide a flexible manner of describing asset(s) and an efficient way of locating matching description(s).

In accordance with an aspect of the present invention, the system facilitates composition of asset(s) into application(s). For example, the system can reduce cost and/or complexity of managing/deploying hardware and/or software for complex infrastructures by automating a number of time-consuming and error prone activities.

Another aspect of the present invention provides for an asset specification to be stored according to an asset specification language. For example, the asset specification language can facilitate searching of and/or utilization of asset(s) to compose application(s).

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 4 is a diagram of an exemplary asset description schema in accordance with an aspect of the present invention.

DETAILED DESCRIPTION OF THE INVENTION

Figure 1:
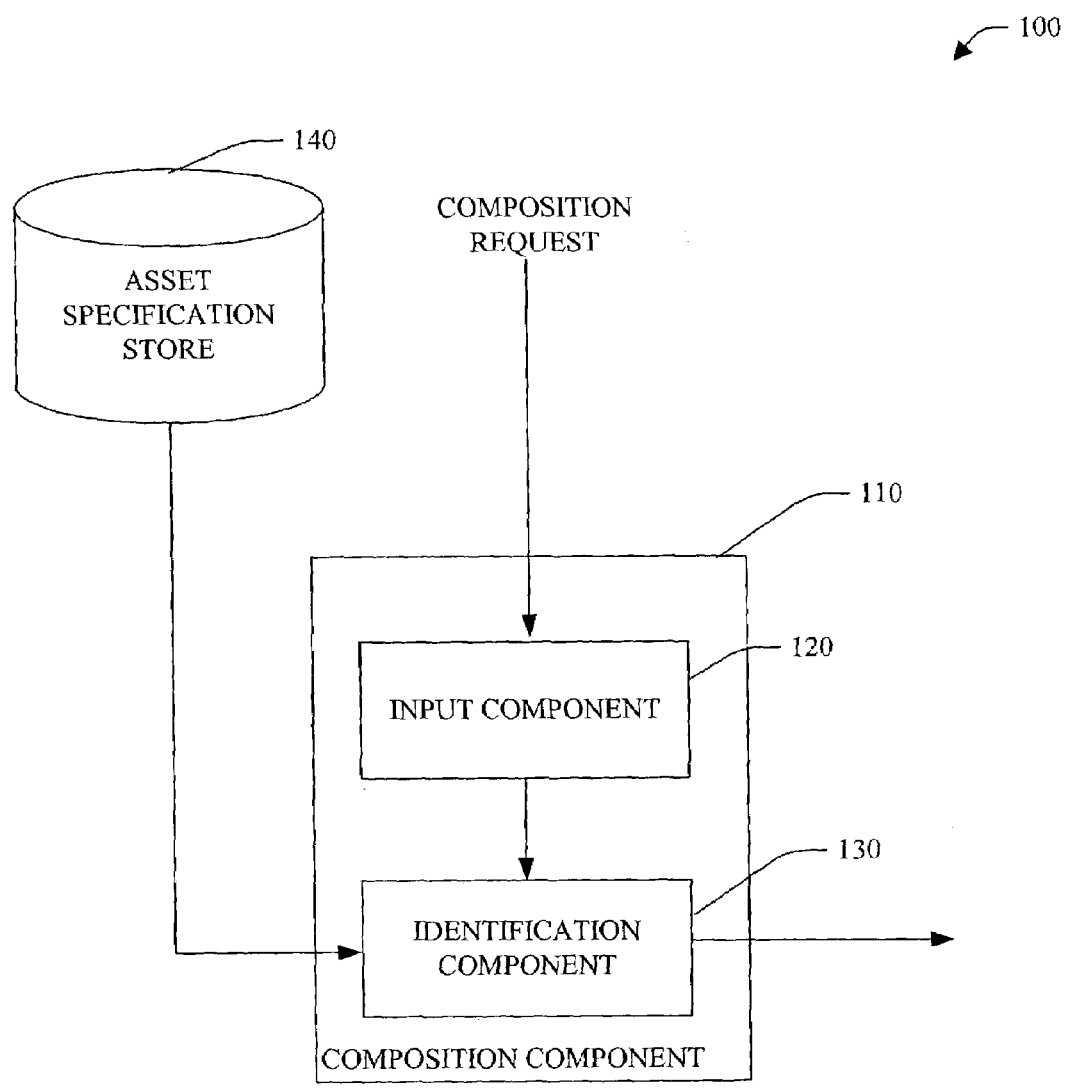
FIG. 1 is a block diagram of a system facilitating asset composition in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers. Further, "asset(s)" is intended to refer to computer hardware, software (e.g., component(s), operating system(s) and/or database management system(s)). An asset can be a computer component as that term is described herein.

Referring to FIG. 1, a system facilitating asset composition 100 in accordance with an aspect of the present invention is illustrated. The system 100 facilitates asset composition based, at least in part, upon asset specification(s) (e.g., metadata) describing the asset(s). The system 100 employs asset specification(s) (e.g., metadata) that describe compositional property(ies) of asset(s) and ports that describe respective aspects of the assets that support composition to efficiently search and/or match asset(s). The system 100 can provide a flexible, extensible manner of describing asset(s) and an efficient way of locating matching description(s) of asset(s). Thus, the system 100 can reduce cost and/or complexity of managing/deploying hardware and/or software for complex infrastructures by automating a number of time-consuming and error prone activities.

Figure 2:
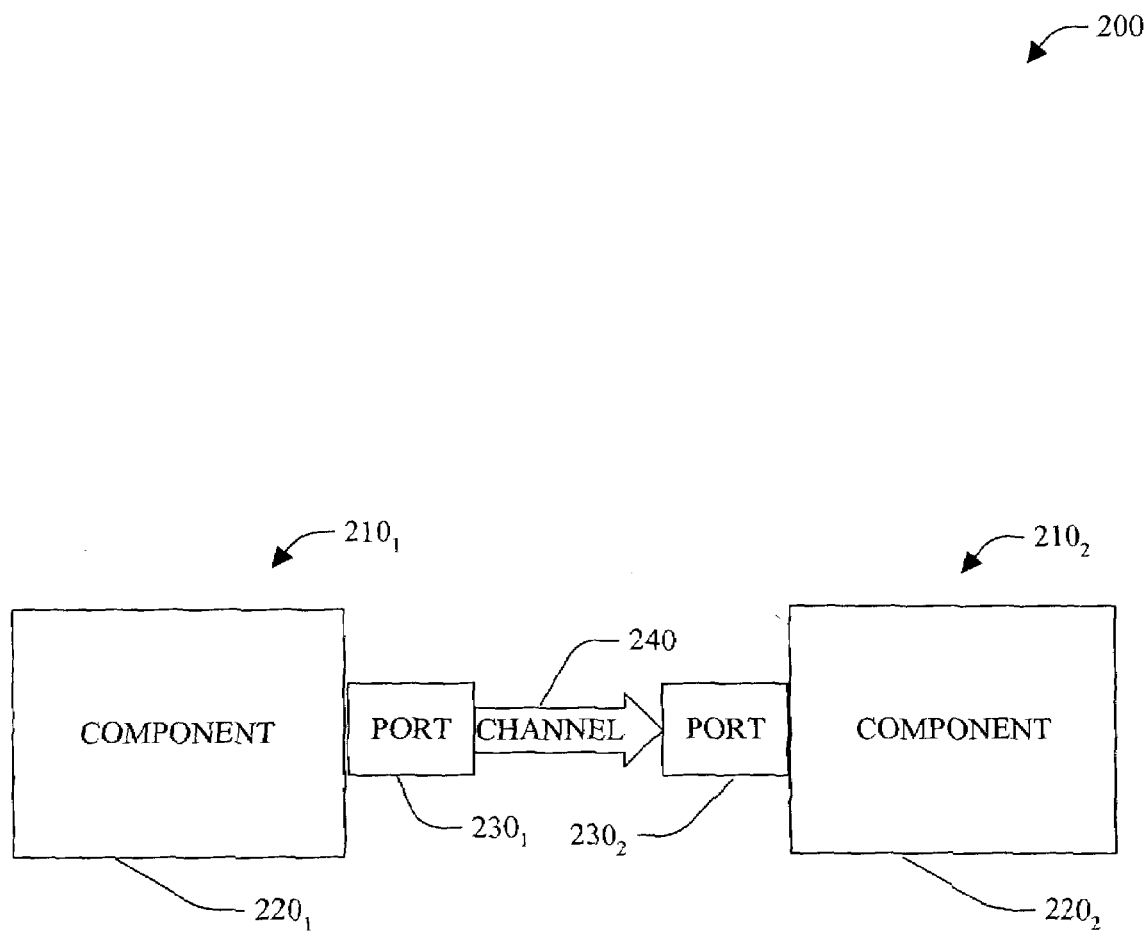
FIG. 2 is a block diagram of an exemplary system employing the system and/or method of the present invention in accordance with an aspect of the present invention.

Referring briefly to FIG. 2, an exemplary system 200 employing the system and/or method of the present invention in accordance with an aspect of the present invention is illustrated. The system 200 includes a first asset $210_1$ and a second asset $210_2$. The first asset $210_1$ includes a first component $220_1$ having a port $230_1$; the second asset $210_2$ includes a second component $220_2$ having a port $230_2$. The first asset $210_1$ is coupled to the second asset $210_2$ via a channel 230. The system 100 can be employed to match the first asset $210_1$ with the second asset $210_2$ via the channel 240. The channel 240 can also be an "asset" as defined herein.

Returning to FIG. 1, the system 100 includes a composition component 110 having an input component 120 and an identification component 130. Optionally, the system 100 can further include an asset specification store 140. The composition component 110 receives a composition request as an input. Based, at least in part, upon the composition request, the composition component searches the asset specification store 140 for asset(s) responsive to the composition request. The composition component 110 can provide information associated with the responsive assets as an output (e.g., to be utilized to compose an application). In one example, the composition component 110 can provide a listing of asset(s) responsive to the composition request. In another example, the composition component 110 initiates construction of an application composed of assets responsive to the composition request.

The input component 120 receives the composition request. The composition request can be based, for example, upon a user's requirement(s) and/or manufacturing information. The identification component 130 receives the composition request from the input component 120. The identification component 130 can search the asset specification store 140 for assets responsive to the composition request. For example, based, at least in part, upon the composition request, the identification component 130 can formulate a search strategy to facilitate identification of asset(s) responsive to the composition request. In another example, the identification component 120 can employ an asset matching algorithm as described below.

The asset specification store 140 can store asset specification information (e.g., metadata) associated with asset(s). An asset specification is the metadata that describes compositional property(ies) of asset(s) and ports that describe respective aspects of the assets that support composition. Thus, the asset specification can include port(s), which describe a particular aspect of an asset that supports composition (e.g., ActiveX control interface(s), processor requirement(s) and/or library requirement(s)). A port can include alternative interface(s) that can be used to link asset(s). An interface can include list(s) of service(s), requirement(s) and/or wants that specify the service(s) the interface provides, requires and/or can optionally use. In one example, information is stored in the asset specification store 140 based upon an asset specification language as described below.

Further, interface(s) can have configuration information that is instantiated when composing assets. Asset composition includes matching ports, setting configuration information, and providing code or deployment information to link pairs of ports. Asset contracts record the two interfaces being linked and configuration information for those interfaces.

While FIG. 1 is a block diagram illustrating components for the system 100, it is to be appreciated that the system 100, the composition component 110, the input component 120, the identification component 130 and/or the asset specification store 140 can be implemented as one or more computer components, as that term is defined herein. Thus, it is to be appreciated that computer executable components operable to implement the system 100, the composition component 110, the input component 120, the identification component 130 and/or the asset specification store can be stored on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

Figure 3:
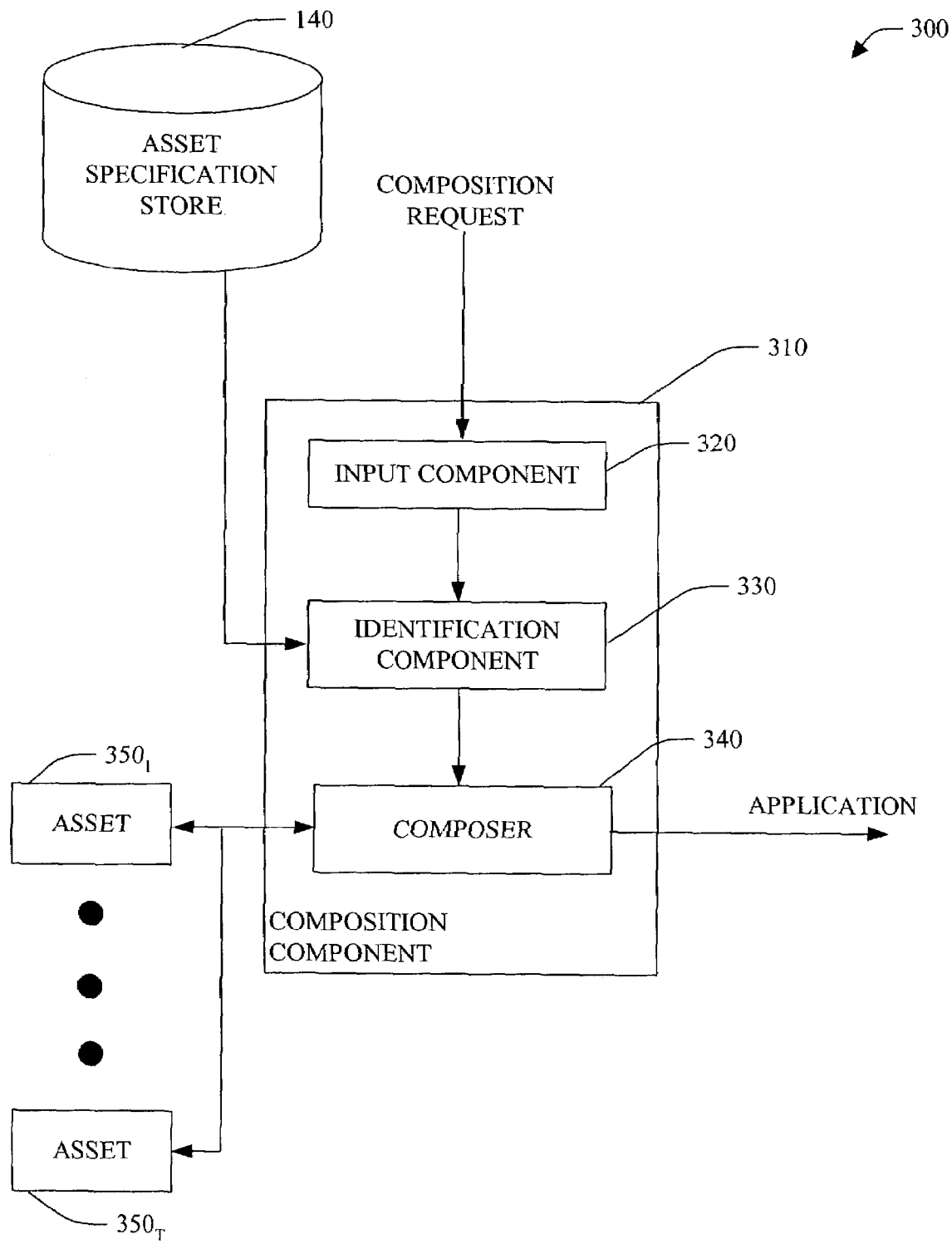
FIG. 3 is a block diagram of a system facilitating asset composition in accordance with an aspect of the present invention.

Turning to FIG. 3, a system facilitating asset composition 300 in accordance with an aspect of the present invention is illustrated. The system 300 includes a composition component 310 having an input component 320, an identification component 330 and a composer 340. Optionally, the system 300 can further include an asset specification store 140 and/or a first asset $350_1$ through an Tth asset $350_T$, T being an integer greater to or equal to one. The first asset $350_1$ through the Tth asset $350_T$ can be referred to collectively as the asset(s) 350.

The input component 320 receives a composition request. The composition request can be based, for example, upon a user's requirement(s) and/or manufacturing information. The identification component 330 receives the composition request from the input component 320. The identification component 330 can search the asset specification store 140 for asset(s) responsive to the composition request. For example, based, at least in part, upon the composition request, the identification component 330 can formulate a search strategy (e.g., using an asset matching algorithm) to facilitate identification of asset(s) 350 responsive to the composition request.

The composer 340 receives information regarding asset(s) 350 responsive to the composition request from the identification component 330. Based, at least in part, upon this information, the composer 340 composes an application comprising asset(s) 350. For example, the composer 340 can link a port of one asset 350 with a port of another asset 350 (e.g., via matching the ports, setting configuration information and/or providing code or deployment information). It is to be appreciated that composition component 310, the input component 320, the identification component 330 and/or the composer 340 can be computer components as that term is defined herein.

Next, referring to FIG. 4, an exemplary asset description schema 400 in accordance with an aspect of the present invention is illustrated. For example, asset specification information stored in the asset specification stored can be based upon the schema 400 and the asset specification language described herein.

The schema 400 is based upon an asset specification language that includes an asset description 410 and a list of port specification(s) 430. The following grammar describes the contents of a section:

TABLE 1

| | |
|---|---|
| clause | ← and \| or \| not \| implies \| predicate |
| and | ← clause and clause |
| or | ← clause or clause |
| not | ← not clause |
| implies | ← clause implies clause |
| predicate | ← term relation term |
| ← id ( ( term ( , term )* ) )opt | |
| relation | ← < \| <= \| > \| >= \| = \| != |

TABLE 1-continued

| term | ← variable \| integer \| float \| string \| date |
|---|---|
| variable | ← id |
| A ground predicate is a predicate containing no variables. | |

Asset Description

The asset description 410 provides a description of the asset. An asset description is a list of ground predicates 420. For example, a component can have the following asset description 410:
- Asset Kind: Assembly
- Location: \\components\standard\grid.dll
- Created: Jan. 2, 2001
- Company: Microsoft Corporation
- License: redistributable Port Specification A port specification 430 describes an individual port. Pairs of ports can be linked together when assets are composed with other assets (e.g., to form application(s)). Port specifications 430 consist of a port description 440 and a list of interface specification(s) 450.

Port Description

The port description 440 provides a description of a port. The port description is a list of ground predicate(s) 460. An exemplary port description 440 is:
- Kind: COM Interface
- CLSID: {00028C00-0000-0000-0000-000000000046})

Interface

An interface 450 describes a particular way of linking to a port. An interface 450 can include a configuration section 470, a services section 480, a requirements section 488 and/or a wants section 496.

Configuration Section

The configuration section 470 provides configuration information for the port. The configuration section 470 is a list of predicates. For example, a component can have the following configuration section 470:
- Security level: (trusted)

When two assets are composed the variables in the configuration section 470 are set to record the details of the contract between the assets.

Services Section

The services section 480 provides information about the services the port interface provides. The services section 480 is a list of ground predicates. For example, a component can have the following services section 480:
- Implements: IOleConnectionPointContainer
- Implements: IOleControl
- Implements: IOleInPlaceActiveObject
- Implements: IOleInPlaceObject
- Implements: IPersistStorage
- Implements: IPersistStream
- Implements: IUnknown
- Implements: IViewObject
- Implements: IViewObject2

Requirements Section

The requirements section 488 provides information about the service(s) the port interface requires of asset(s) using the port interface. The requirements section 488 is a list of clauses. For example, a component can have the following requirements section 488:
- Implements: IOleUndoManager Because requirements (and wants) can be clauses, sophisticated requirements are possible. For example:
- Available RAM(X) and X>50 Mb meaning the available ram must be greater than 50 Mb or
- (Available RAM(X) and X>50 Mb and Available CPU(Y) and Y>50) or
- (Available RAM(X) and X>80 Mb and Available CPU(Y) and Y>20) expressing a time/memory tradeoff.

Since the service sections 480 include ground predicates, evaluation of whether a requirement is met by the services of a port can be performed efficiently.

Wants Section

The wants section 496 provides information about the services the port interface could productively use from assets using the port interface. The wants section 496 is a list of clauses. For example, a component can have the following wants section 496:
- Implements: IOleUndoManager2

The wants section 496 allows an asset matching algorithm to make a good choice between several acceptable port interfaces 450.

An exemplary asset specification follows:
- Server
- Description
- Kind: Server
- Name: PowerEdge 2400
- Manufacturer: Dell
- Port 1
- Description
- Port Kind: Processor specification
- Interface 1
- Services
- Available CPU: 100
- Available RAM: 500 MB
- Available File Space: 36 GB
- RAID: 5
- Port 2
- Description
- Port Kind: electrical specification
- Interface 1
- Requirements
- Power: 330 Watts
- Wants
- Uninterruptible power supply
- Port 3
- Description
- Port Kind: Environment specification
- Interface 1
- Requirements
- Space: >17.5", >10.5", >23.5"
- Ambient Temperature: >10C.
- Ambient Temperature: <35C.
- Relative Humidity: >=8%
- Relative Humidity: <=80%
- Port 4
- Description
- Kind: Network connection
- Interface 1
- Requirements
- Ethernet: 100

Another exemplary asset specification is:
- SQL Server
- Description
- Kind: DBMS
- Name SQL Server Version: 8
Port 1
Description
Kind: Processor specification
Interface 1
Requirements
Available CPU: 17
Available RAM: 64 MB
Available File Space: 270 MB
Wants
Available RAM: 128 MB
RAID: ≧0

Figure 5:
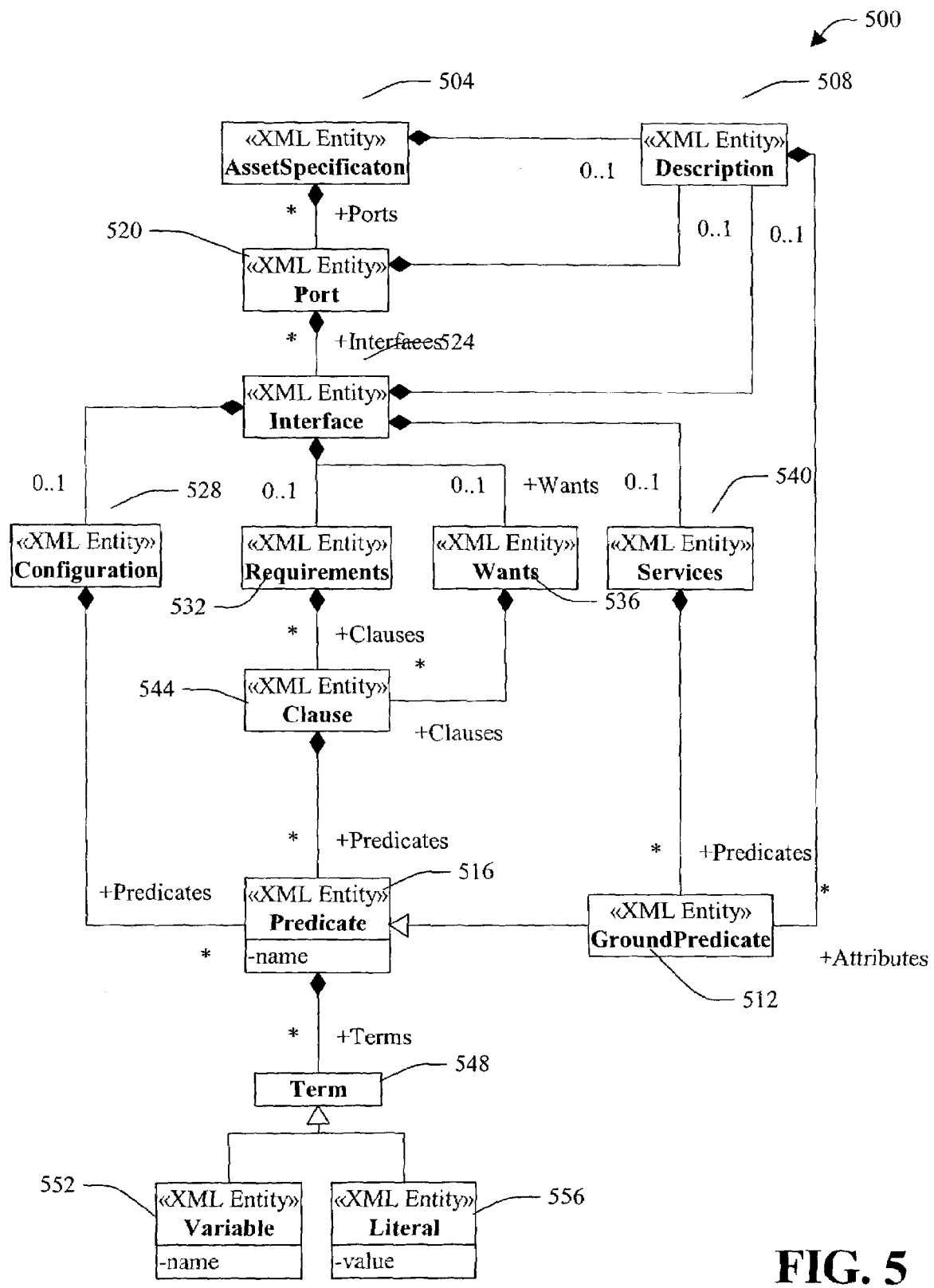
FIG. 5 is a diagram of an exemplary XML asset description schema in accordance with an aspect of the present invention.

Yet another exemplary asset specification is:
Data Grid
Description
Kind: Control
Name: DB data grid
Location: tmsvr:\\delta\shared\controls\dbgrid
Port 1
Interface 1
Description
Kind: COM Interface
CLSID: {00028C00-0000-0000-0000-000000000046})
Services
Implements: IOleConnectionPointContainer
Implements: IOleControl
Implements: IOleInPlaceActiveObject
Implements: IOleInPlaceObject
Implements: IPersistStorage
Implements: IPersistStream
Implements: IUnknown
Implements: IViewObject
Implements: IViewObject2
Requirements
Wants
Implements: IOleUndoManager
Port 2
Description
Port Kind: Processor specification
Interface 1
Requirements
Available CPU: >50
Available RAM: >1 MB
Wants
Available RAM: >2 MB A fourth exemplary asset specification is:
Data Grid
Description
Kind: Control
Name: DDS
Location: tmsvr:\\delta\shared\controls\dds
Port 1
Interface 1
Description
Kind: COM Interface
CLSID: {00028C00-0000-0000-0000-000000000046})
Services
Implements: IOleConnectionPointContainer
Implements: IOleControl
Implements: IOleInPlaceActiveObject
Implements: IOleInPlaceObject
Implements: IPersistStorage
Implements: IPersistStream
Implements: IUnknown
Implements: IViewObject
Implements: IViewObject2
Requirements
Wants
Implements: IOleUndoManager
Port 2
Description
Port Kind: Processor specification
Interface 1
Requirements
Available CPU: >50
Available RAM: >1 MB
Wants
Available RAM: >2 MB Referring next to FIG. 5, an exemplary XML asset description schema 500 in accordance with an aspect of the present invention is illustrated. The schema 500 represents a hierarchical representation of the schema 400 employed using XML. The filled-in diamond represents ownership or a claim of right of another entity. The notation "0 . . . 1" denote an optional inclusion or exclusion of the entity. The notation "*" denotes a naming convention (e.g., AssetSpecification.Port).

The highest element of the schema 500 is an XML entity AssetSpecification 504. The XML entity AssetSpecification 504 can include an XML entity Description 508 which in turn can include an XML entity GroundPredicate 512 which is a sub-class of an XML entity Predicate 516.

Next, The XML entity Asset Specification 504 can further include an XML entity Port 520. The XML entity Port 520 can include the XML entity Description 508 which can include the XML entity GroundPredicate 512. The XML entity Port 520 includes an XML entity Interface 524. The XML entity Interface can include the XML entity Description 508, an XML entity Configuration 528, an XML entity Requirements 532, an XML entity Wants 536 and/or and XML entity Service 540. The XML entity Requirements 532 and/or the XML entity Wants 536 can include an XML entity Clause 544. The XML entity Predicate can include a Term 548. The Term 548 can include an XML entity Variable 552 and/or an XML entity Literal 556.

Figure 6:
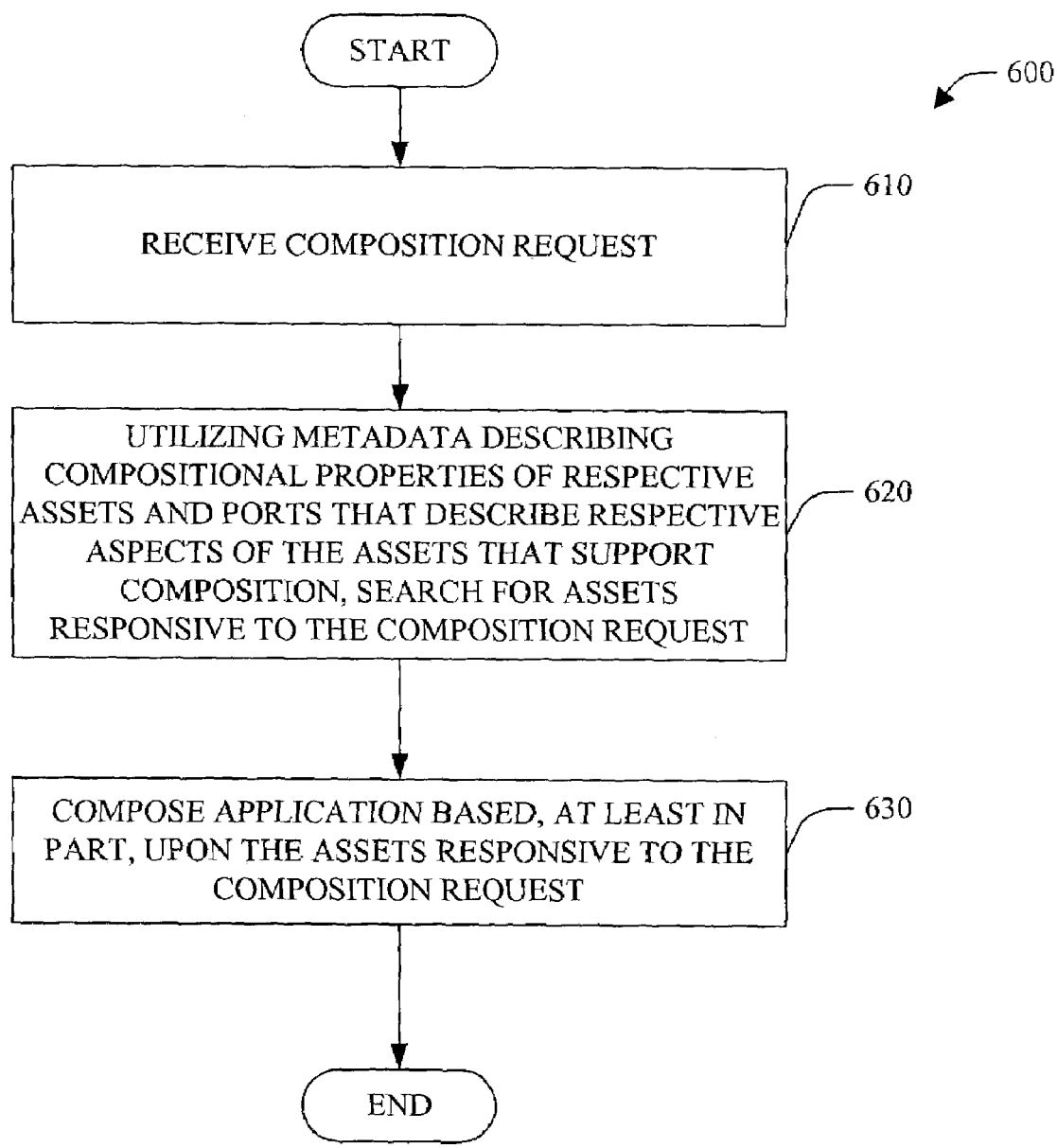
FIG. 6 is a flow chart of a method of performing asset composition in accordance with an aspect of the present invention.
Figure 7:
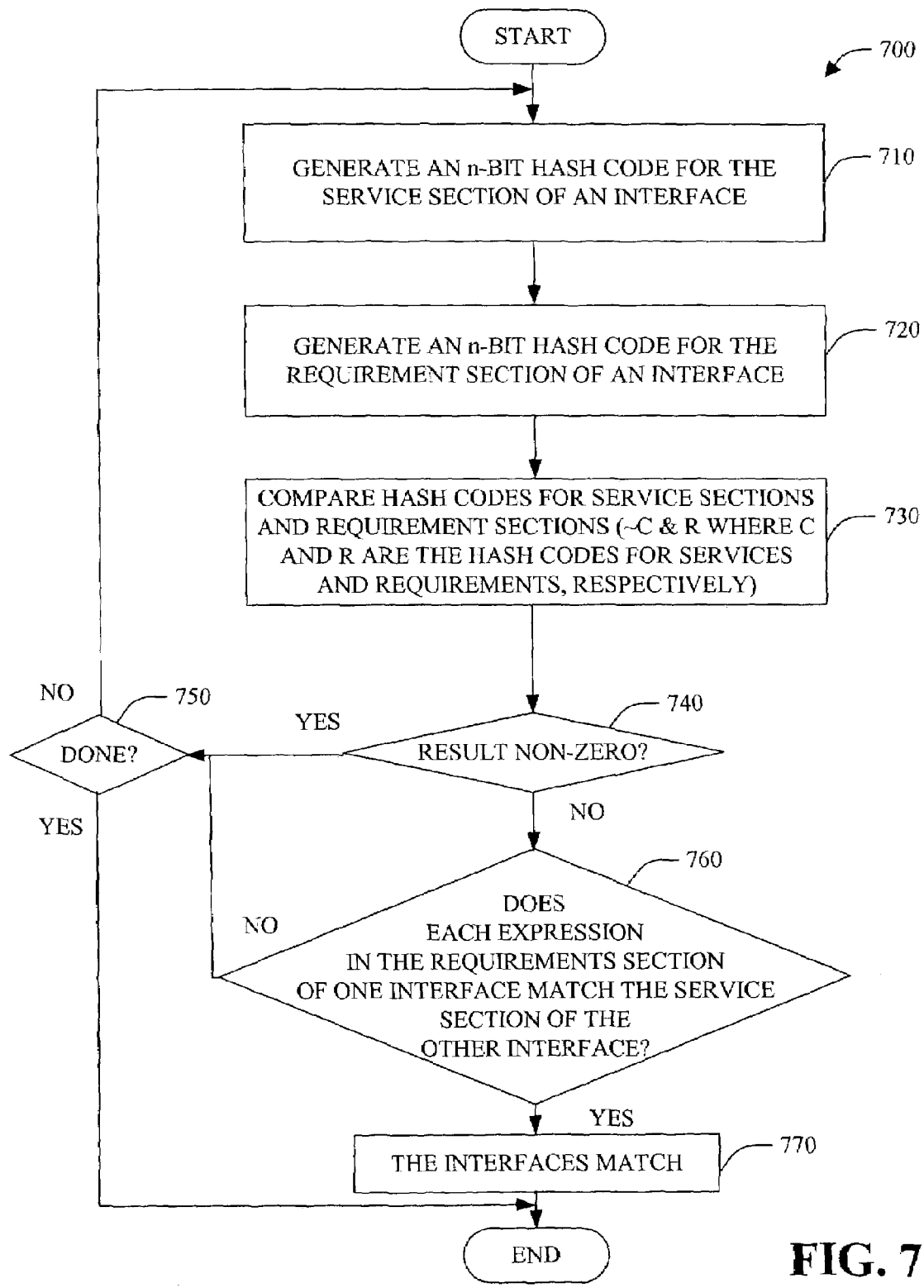
FIG. 7 is a flow chart of a method of matching assets in accordance with an aspect of the present invention.

Turning briefly to FIGS. 6 and 7, methodologies that may be implemented in accordance with the present invention are illustrated. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 6, a method of performing asset composition 600 in accordance with an aspect of the present invention is illustrated. At 610, a composition request is received (e.g., by an input component 120 and/or an input component 220). At 620, metadata describing compositional properties of respective assets and ports that describe respective aspects of the assets that support composition is employed to search for assets responsive to the composition request. At 630, an application is composed based, at least in part, upon the assets responsive to the composition request.

Next, referring to FIG. 7, a method of matching assets 700 in accordance with an aspect of the present invention is illustrated. For example, as noted previously, the identification component 130 and/or the identification component 330 can employ an asset matching algorithm based, at least in part, upon the method 700 to efficiently match assets. A key to efficiently matching assets is to suitably restrict the expressivity of asset specifications. Ideally, the restricted expressivity is not a practical limitation.

The strategy used in method 700 is to limit the expressiveness of asset services to the language:

$$(G_{1,1} \text{ and } G_{1,2} \text{ and } \ldots) \text{ or } (G_{2,1} \text{ and } G_{2,2} \text{ and } \ldots) \quad (1)$$

Where $G_{i,j}$ is a ground predicate. The asset specification language described herein is reasonably expressive but cost effective to test the truth of statements against. Interfaces correspond to the bracketed expressions of (1)

At 710, to quickly eliminate interfaces that cannot match, an n-bit hash code is generated for the service section of an interface. It is computed by hashing each predicate in the interface and turning on the relevant bit in the hash code. At 720, a similar hash code is generated for the requirements section of an interface (e.g., built in predicates like ">" and not-clauses ignored).

At 730, the hash codes are then compared using the expression ~C & R where C and R are the hash codes for services and requirements. At 740, a determination is made as to whether the result of 730 is non-zero (e.g., if the result is non-zero then the two interfaces cannot match). If the determination at 740 is YES, at 750 a determination is made as to whether the matching algorithm is done (e.g., substantially all combinations of service sections and requirements sections compared). If the determination at 750 is NO, processing continues at 710. If the determination at 750 is YES, no further processing occurs.

If the determination at 740 is NO, processing continues at 760. Once two interfaces have been found that can potentially match then each expression in the requirements section of one interface can be matched against the service section of the other interface. Thus, at 760, a determination is made as to whether each expression in the requirements sections of one interface matches the service section of the other interface. This can be done with a simple backtracking algorithm (e.g., a full scale unification algorithm is not needed). The algorithm need only record variable matches since services contain only ground predicates. The predicate hash codes computed earlier can be used to perform fast predicate matching. If the determination at 770 is NO, processing continues at 750. If the determination at 770 is YES, at 770, the interfaces match (e.g., the application can be generated) and no further processing occurs.

If needed, further performance gains may be possible by using larger hash codes and joining them together (using binary or) to produce hash codes for ports or even assets. If not-clauses are frequently used then it may pay to generate a hash code for predicates that are inside not-clauses (care must be taken to handle the cases where not clauses are nested).

Figure 8:
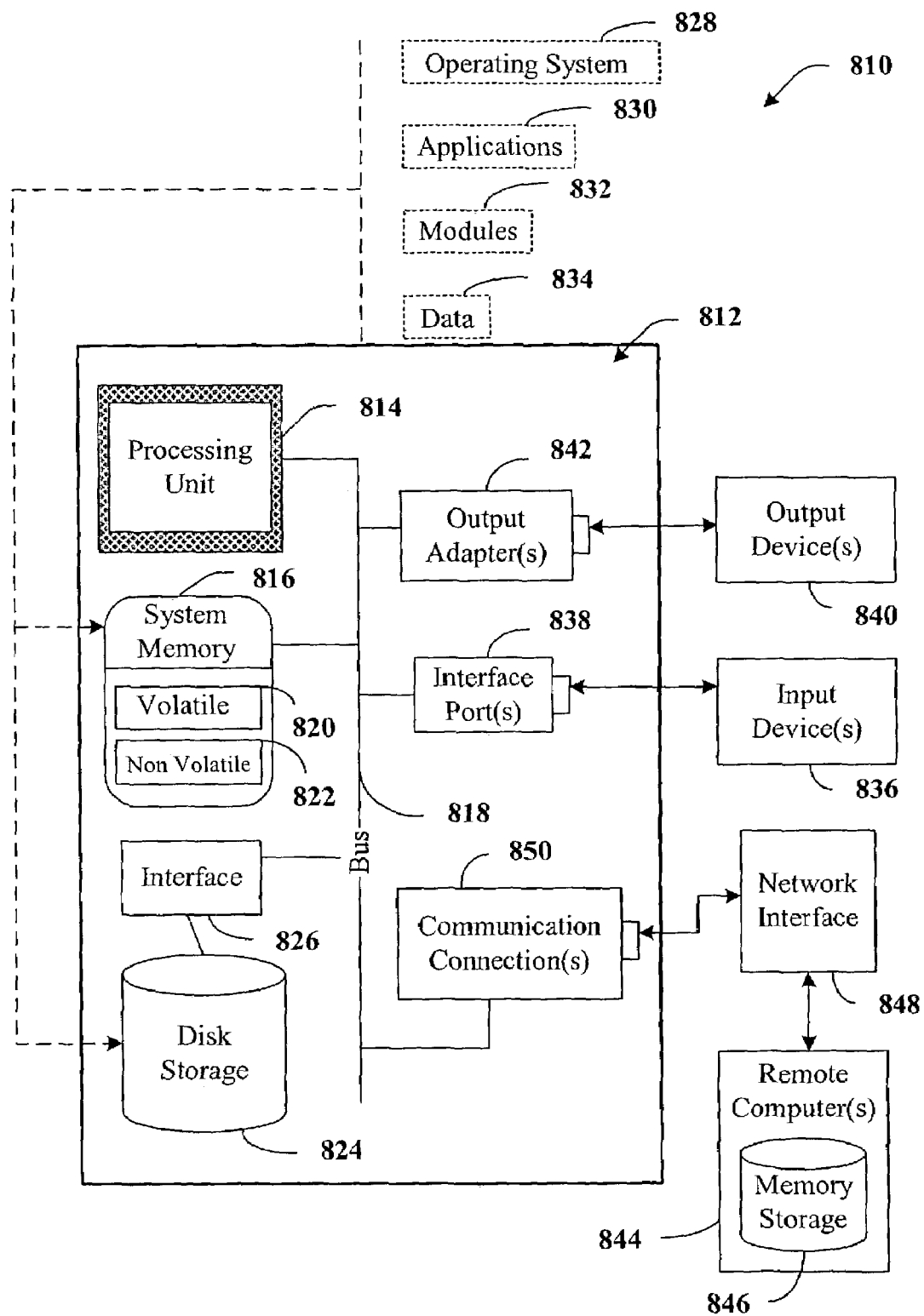
FIG. 8 illustrates an example operating environment in which the present invention may function.

In order to provide additional context for various aspects of the present invention, FIG. 8 and the following discussion are intended to provide a brief, general description of a suitable operating environment 810 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 810 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 8, an exemplary environment 810 for implementing various aspects of the invention includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/nonremovable, volatile/nonvolatile computer storage media. FIG. 8 illustrates, for example a disk storage 824. Disk storage 824 includes, but is not limited to, devices like a magnetic disk drive, floppy disk drive, tape drive, Jaz drive, Zip drive, LS-100 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating enviromnent 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that the present invention can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers among other output devices 840 that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of performing asset composition with reduced complexity by automating otherwise time-consuming and error prone activities, the method comprising:

utilizing at least one processor of a computing system, accessing a plurality of asset specifications, the plurality of asset specifications being stored in an asset specification store and each asset specification including metadata in an XML-based schema that describes compositional properties of respective assets and ports that support composition, wherein the XML-based schema for the asset specification for each of the plurality of assets includes:

an asset description as a list of ground predicates; and a port specification describing an individual port, wherein the port specification includes at least:

a port description as a list of ground predicates, wherein each ground predicate has no variables; and a port interfaces section including at least:

a configuration section;

a requirements section;

a services section; and a wants section;

responsive to a composition request, searching the plurality of asset specifications, and the metadata therein, to match at least a first asset providing a service with at least a second asset having a requirement matching the service of the first asset, wherein matching the first asset with the second asset comprises:

computing a first hash, the first hash being a hash of the services section of an asset specification corresponding to the first asset;

computing a second hash, the second hash being a hash of the requirements section of an asset specification corresponding to the second asset;

comparing the first hash to the second hash, and obtaining a zero result from the determination; and after comparing the first hash to the second hash, determining whether each expression in the requirements section of the asset specification of the second asset matches expressions in the services section of the asset specification of the first asset, and recording only variable matches as the services contain only ground predicates; and composing an application that includes the at least first asset providing the service and the at least second asset having a requirement matching the provided service of the at least first asset, wherein composing the application includes linking ports of the first and second assets, as identified in respective asset specifications within the plurality of asset specifications, wherein composing the application is performed responsive to the composition request, and wherein communication between the first and second assets, through the ports, is provided through a third asset, wherein the third asset is a channel.

2. The method of claim 1 further comprising receiving the composition request.

3. A computing system facilitating asset composition with reduced complexity and automation of otherwise time-consuming and error prone activities, the system comprising:
   a processor;
   an asset specification store; and
   at least one of a hardware component or one or more computer readable media communicatively coupled to the processor and the asset specification store, and including:
      a composition component comprising that:
         receives a composition request, wherein the composition request includes a request that at lest two assets be composed together via respective ports;
         utilizes metadata within the asset specification store, wherein the metadata is in an XML-based schema and describes asset specification information for a plurality of assets, and wherein the metadata is utilized in searching for assets responsive to the composition request, the asset specification information comprising compositional properties of respective assets and ports that describe respective aspects of the assets that support composition, and wherein the XML-based schema for the asset specification for each of the plurality of assets includes:
            an asset description as a list of ground predicates; and
            a port specification describing an individual port, wherein the port specification includes:
   a port description as a list of ground predicates, wherein each ground predicate has no variables; and
      a port interfaces section that includes:
   a configuration section;
   a requirements section;
   a services section; and
   a wants section;
   utilizes the metadata in matching a first asset having a first description and first port with a second asset having a second description and a second port, wherein the first port describes services provided by the first asset, and wherein the second port of the second asset describes requirements of the second asset, and wherein matching the first asset with the second asset comprises:
      computing a first hash, the first hash being a hash of the services section of an asset specification corresponding to the first asset;
      computing a second hash, the second hash being a hash of the requirements section of an asset specification corresponding to the second asset;
      comparing the first hash to the second hash, and obtaining a zero result from the determination; and
      after comparing the first hash to the second hash, determining whether each expression in the requirements section of the asset specification of the second asset matches expressions in the services section of the asset specification of the first asset and recording only variable matches as the services contain only ground predicates; and
   automatically composing an application that includes the first asset and the second asset, which communicate over the first port and the second port, with the first asset providing the services to the second asset, wherein communication between the first asset and second asset occurs through a third asset, which third asset is a channel.

4. The system of claim 3, the first and second assets comprising at least one of a computer hardware component, a software component, an operating system, or a database management system.

5. The system of claim 3, the compositional properties of the asset specifications of the first and second assets consisting of: the asset description, and the port specifications, wherein port specifications consists of the port description, and the interface section, with the interface section consisting of the configuration section, the services section, the requirements section, and the wants section.

6. One or more computer-readable storage media for facilitating asset composition, the computer-readable storage media comprising:
   an input component;
   an identification component; and
   a composition component, wherein each of the input component, identification component, and composition component are communicatively coupled, such that when executed by a processor, they collectively cause a computing system to perform the method of claim 1.

7. A computer readable storage medium storing computer executable components of a composition component, comprising:
   an input component that receives a composition request, wherein the composition request includes a request that three assets be composed together to form an application, with at least two of the assets communicating with each other via respective ports and the third asset;
   an identification component that:
      responsive to the composition request, accesses a plurality of asset specifications for a plurality of assets, the plurality of asset specifications being stored in an asset specification store and describing the plurality of assets using metadata in an XML based schema to provide descriptions of compositional properties of assets and ports for the assets, wherein the XML-based schema for the asset specification for each of the plurality of assets consists of:
         an asset description as a list of ground predicates; and
         a port specification describing an individual port, wherein the port specification consists of:
            a port description as a list of ground predicates, wherein each ground predicate has no variables; and
            a port interfaces section that consists of:
   a configuration section;
   a requirements section;
   a services section; and
   a wants section:
   utilizes the metadata in the XML-based schema in searching for assets responsive to the composition request, and matching a first asset with a second asset, wherein matching the first asset with the second asset comprises:
      computing a first hash, the first hash being a hash of the services section of an asset specification corresponding to the first asset;
      computing a second hash, the second hash being a hash of the requirements section of an asset specification corresponding to the second asset;
      comparing the first hash to the second hash, and obtaining a zero result from the determination; and
      after comparing the first hash to the second hash, using a backtracking algorithm and determining whether each expression in the requirements section of the asset specification of the second asset matches expressions in the services section of the asset specification of the first asset, and recording only variable matches as the services contain only ground predicates; and a composer component that composes an application that includes the first and second assets, wherein composing the application also includes linking ports of the first and second assets identified in respective asset specifications, and wherein communication between the first and second assets, through the ports, is provided through a third asset, wherein the third asset is a channel.

* * * * *

UNITED STATES PATENT AND TRADEMARK OFFICE
CERTIFICATE OF CORRECTION

| | | |
|---|---|---|
| PATENT NO. | : 7,702,668 B2 | Page 1 of 1 |
| APPLICATION NO. | : 10/462413 | |
| DATED | : April 20, 2010 | |
| INVENTOR(S) | : Anthony Bloesch et al. | |

It is certified that error appears in the above-identified patent and that said Letters Patent is hereby corrected as shown below:

In column 13, line 16, in Claim 3, delete "lest" and insert -- least --, therefor.

In column 13, line 61, in Claim 3, delete "asset" and insert -- asset, --, therefor.

Signed and Sealed this
Twenty-fifth Day of January, 2011

David J. Kappos
*Director of the United States Patent and Trademark Office*